United States Patent
Zhang et al.

(10) Patent No.: US 9,024,264 B2
(45) Date of Patent: May 5, 2015

(54) TEMPERATURE COMPENSATION FOR A DETECTION DEVICE IN AN IMAGING SYSTEM AND DETECTION DEVICES AND IMAGING SYSTEMS THEREFROM

(71) Applicant: Siemens Medical Solutions USA, Inc., Malvern, PA (US)

(72) Inventors: Nan Zhang, Knoxville, TN (US); Matthias Schmand, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 295 days.

(21) Appl. No.: 13/648,295

(22) Filed: Oct. 10, 2012

(65) Prior Publication Data

US 2013/0092842 A1    Apr. 18, 2013

Related U.S. Application Data

(60) Provisional application No. 61/548,239, filed on Oct. 18, 2011.

(51) Int. Cl.
*G01T 1/29* (2006.01)
*G01T 1/161* (2006.01)
*G01T 1/20* (2006.01)
*G01T 1/208* (2006.01)

(52) U.S. Cl.
CPC .............. *G01T 1/2985* (2013.01); *G01T 1/1612* (2013.01); *G01T 1/20* (2013.01); *G01T 1/208* (2013.01)

(58) Field of Classification Search
CPC ....... G01T 1/2985; G01T 1/1612; G01T 1/20; G01T 1/208
USPC .................................... 250/363.03, 363.04
See application file for complete search history.

(56) References Cited

U.S. PATENT DOCUMENTS

| | | | |
|---|---|---|---|
| 4,750,497 A * | 6/1988 | Suzuki et al. | 600/549 |
| 2007/0058989 A1* | 3/2007 | Kaku et al. | 398/209 |
| 2009/0114827 A1* | 5/2009 | Burbar et al. | 250/363.09 |
| 2011/0248175 A1* | 10/2011 | Frach et al. | 250/363.03 |

* cited by examiner

*Primary Examiner* — David Porta
*Assistant Examiner* — Mindy Vu
(74) *Attorney, Agent, or Firm* — Peter Kendall

(57) ABSTRACT

A smart sensor for maintaining constant gain in a photosensor despite temperature is disclosed. The smart sensor receives temperature data from a temperature sensor, then compares the temperature data to a lookup table of temperatures corresponding to voltages which, when applied to a photosensor at that temperature, will produce a desired gain. The smart sensor then applies the voltage from the lookup table to the photosensor, to yield a desired gain from the photosensor. The smart sensor is particularly applicable to SiPMs used in PET/MRI imaging systems.

12 Claims, 8 Drawing Sheets

TEMPERATURE COMPENSATION FOR A DETECTION DEVICE IN AN IMAGING SYSTEM AND DETECTION DEVICES AND IMAGING SYSTEMS THEREFROM

CROSS-REFERENCE TO RELATED APPLICATION

This application claims the benefit of U.S. provisional application entitled "Smart-Sensor Based Temperature Compensation Scheme for SiPM Detectors in PET" filed Oct. 18, 2011, and assigned Ser. No. 61/548,239, the entire disclosure of which is hereby incorporated by reference.

FIELD

The subject matter herein generally relates to temperature compensation for imaging systems, and in particular, to maintaining a photosensor's performance during through temperature changes.

BACKGROUND

In medical imaging so-called "hybrid modalities" are becoming increasingly important, for example PET-CT, SPECT-CT, PET-MRI and SPECT-MRI. The meanings of these abbreviations are as follows:
  PET: Positron Emission Tomography
  CT: Computed Tomography (e.g. X-ray)
  SPECT: Single Photon Emission Computed Tomography
  MRI: Magnetic Resonance Imaging
The advantage of these combinations is the combination of a modality with a high local resolution (especially MRI or CT) with a modality with high sensitivity (especially SPECT or PET) so that anatomical images may be combined with biologic function images for a more complete clinical image.

In the case of MRI, locating an array of imaging detectors inside the bore of a MRI system presents to the designer many technical challenges, which are exacerbated not only by spatial constraints, magnetic and gradient fields, but also by ohmic and eddy current heating. In general, the magnetic field strength and spatial constraints of a MRI system limit optical sensor selection to solid-state types, such as avalanche photo diodes (APDs) and silicon photo multipliers (SiPMs). However, most conventional PET and PET/CT detectors rely on photo multiplier tubes (PMTs) as the primary optical sensing element since they are generally insensitive to temperature fluctuations since their photon conversion elements are incased within an evacuated tube. Unfortunately, most PMTs are highly susceptible to changes in magnetic fields. Further, most conventional PMTs for PET and PET/CT detectors are relatively large (>100 mm). Accordingly, PMTs are generally impractical for use in the spatially restricted, magnetic environment of an MRI system.

In contrast, solid state photosensors, such as APDs and SiPMs, are relatively small in height (1-2 mm) and are typically unaffected by the magnetic fields of an MRI system. However, the gain of such sensors can significantly fluctuate in response to temperature fluctuations of the ambient environment. Therefore, when APDs and SiPMs are used to form an optical sensing element for a PET detector, such gain fluctuations can be very detrimental to the operation of the PET detector, as it generally requires long-term stability in the optical sensing element.

SiPMs have a much higher gain than APDs (about $10^6$, compared with APD of about 200) and a time-of-flight detection capability, and may largely replace APDs in the future. However, as a solid state photosensor, a SiPM is also sensitive to its bias voltage as well as its body temperature. Therefore, in order to successfully use SiPMs, more accurate temperature compensation and higher stability bias voltage regulation must occur.

SUMMARY

Embodiments of the invention temperature compensation and voltage regulation units and systems for sensors used in imaging devices. In a first embodiment of the invention, an apparatus providing a bias voltage based on the ambient temperature of the photosensor is provided. The apparatus includes the photosensor having a voltage input and a temperature sensor which outputs temperature data. The apparatus also includes a computer-readable storage medium storing a temperature lookup table. Additionally, the apparatus includes a processor which uses the temperature data to lookup a new bias voltage in the temperature lookup table. This new bias voltage is used as input to the photosensor, thereby adjusting the gain of the photosensor.

In a second embodiment of the invention, a method is provided. The method includes receiving temperature data associated with a photosensor, then comparing the temperature data to predetermined values stored a lookup table. This yields a voltage for that temperature data which is applied to the photosensor to adjust the gain of the photosensor.

In a third embodiment of the invention, a system having a processor and a photosensor having a gain determined, at least in part, on a voltage input. The system further includes a computer-readable storage medium storing instructions which, when executed by the processor, perform a method of receiving temperature data, comparing the temperature data to values stored in a lookup table to obtain a voltage level specific to the current temperature, and then adjusting the gain of the photosensor by inputting the temperature specific voltage level into the photosensor.

DETAILED DESCRIPTION

Figure 1:
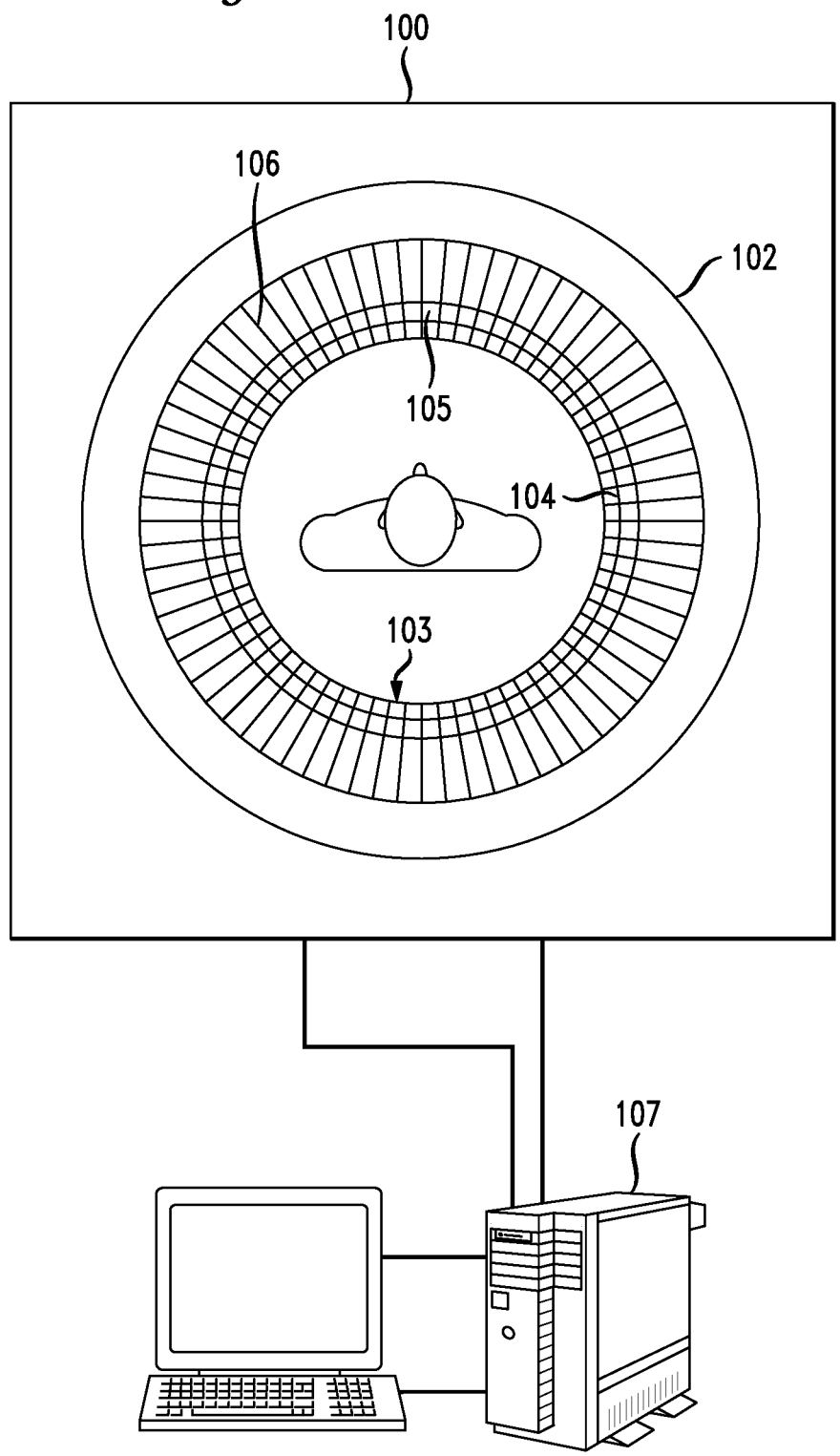
FIG. 1 is a schematic diagram of a combined PET-MRI unit.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, one of the principal concerns when combining PET detectors using solid-state sensors with an MRI system is adjusting the gain of the solid-state sensors based on current temperatures. During usage, the solid-state sensors can experience heating of the printed-circuit-board (PCB), where certain portions of the PCB are heated more than others. There are three main causes of heating in an MRI apparatus: eddy current heating, ohmic heating, and frictional heating. eddy currents are caused when a conductor is exposed to a changing magnetic field due to either the relative motion of the field source and conductor, or due to variations of the field with time. This effect can cause a circulating flow of electrons, or a current, within the body of the conductor. eddy currents generate resistive losses that transform some forms of energy, such as kinetic energy, into heat. Ohmic heating, also known as Joule heating or resistive heating, is the process by which the passage of an electric current through a conductor releases heat. Frictional heating is caused when two bodies, in relative contact, rub against one other as they vibrate out of phase. The vibrations are induced within the detector as well as the surrounding elements, and are commonly a result of Lorentz Forces. A Lorentz force is the force on a point charge due to electromagnetic fields. Strong eddy currents, developed in relatively thick conductive materials, can also contribute to the development of Lorentz Forces.

Two means for adjusting the gain of a photosensor include altering the temperature of the sensor and adjusting the bias voltage of the sensor. Therefore, regardless of how the heating occurs, when heating occurs the heating will adjust the gain being output from the photosensors. To counteract this, one can also manipulate the bias voltage of the photosensor. For instance, if the temperature causes an increase in the gain output from the photosensor, one can lower the bias voltage, resetting the gain to the original level. Alternatively, if the temperature were to decrease and raise the gain from an expected value, one could raise the bias voltage, thereby maintaining the gain at its proper level.

In view of the foregoing, embodiments of the invention provide a smart sensor which automatically tracks and adjusts the high-voltage (HV) input to a photosensor. The smart sensor can utilize a lookup table in an Electronically Erasable Programmable Read-Only Memory (EEPROM) which compares the temperature or temperature data to corresponding voltages for the photosensor. The corresponding values can be based on a first-order linear relationship, or can be customized to temperatures and/or temperature ranges based on non-linear, or non-first order, linear relationships. Whereas analog solutions to improper temperature gain are generally first-order linear voltage-temperature relationships, digital solutions allow for these non-first order linear relationships. These voltage-temperature curves can be recorded digitally through a lookup table on the EEPROM, and can be fully accessible externally. This can allow updates to the EEPROM for specific situations, or as refinements occur. The voltage-temperature curves can, as an example, have a temperature tracking resolution of 0.1° Celsius in a 10° Celsius range.

Although the various embodiments of the invention will be described primarily with respect to a combined PET-MRI system, this is only for illustrative purposes. The various embodiments of the invention are equally applicable to adjusting the gain of photosensors in any system where temperature affects the gain of photosensors, or where temperature influence on photosensor gain may be of concern. In addition, due to possible MR/PET detector space limitations, the overall circuit of the disclosed embodiments can have a reduced footprint compared to other designs. For instance, having photosensor specific voltage input lines creates smaller eddy currents than system wide voltage input lines because of reduced current loop areas.

Referring now to FIG. 1, there is shown therein a conventional facility 100 for overlaid MRI and PET image data acquisition. The facility 100 consists of a known MRI magnet tube 102. The MRI magnet tube 102 defines a longitudinal direction z, extending orthogonally in relation to the plane of the drawing depicted in FIG. 1.

As is shown in FIG. 1, a number of PET detection units 103 are arranged coaxially within the MRI tube 102 in opposing pairs around the longitudinal direction z. The PET detection units 103 can consist of an APD photo diode array 105 with an upstream array of Lutetium Oxyorthosilicate (LSO) scintillator crystals 104 and an electrical amplifier circuit (AMP) 106. The invention is however not restricted to the PET detection units 103 with the APD photo diode array 105 and the upstream array of LSO crystals 104, but other types of photosensors, scintillator crystals and devices can likewise be used for detection.

The image processing for overlaid MRI and PET image display is undertaken by a computing system 107.

Along its longitudinal direction z the MRI tube 102 defines a cylindrical first image field. The plurality of PET detection units 103 defines along the longitudinal direction z a cylindrical second image field. In operation, the second image field of the PET detection units 103 essentially matches the first image field of the MRI tubes 102. This is implemented by a corresponding adaptation of the arrangement density of the PET detection units 103 along the longitudinal direction z.

Figure 2:
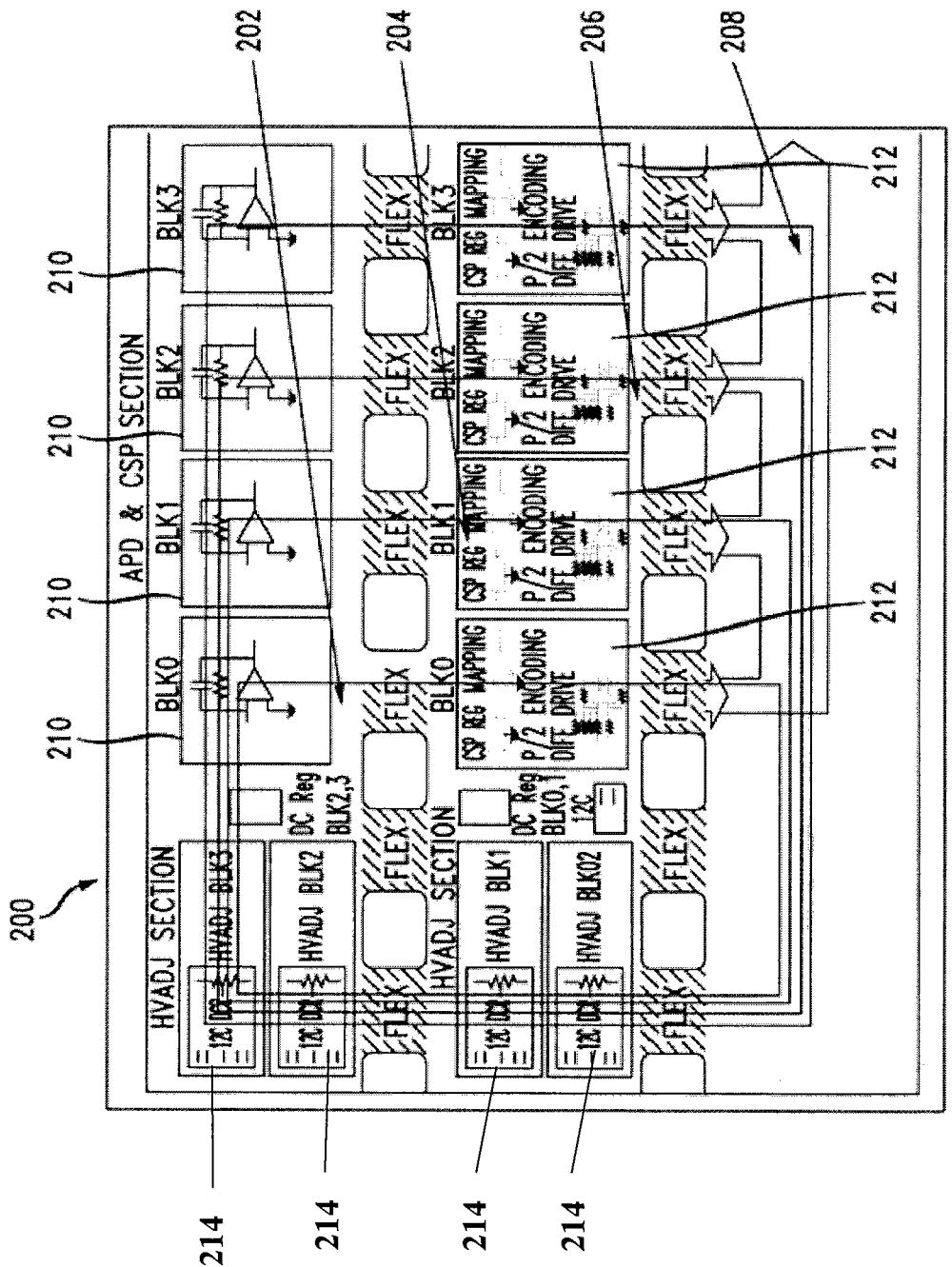
FIG. 2 illustrates eddy currents caused by the high voltage-ground loop area.

Referring now to FIG. 2, FIG. 2 illustrates the effect of eddy currents caused by high voltage-ground loop areas. A circuit 200 has photosensors 210 and differential drivers 212. In this exemplary circuit 200, each photosensor 210 receives its voltage regulation input from a voltage regulator 214 via a wired loop 202, 204, 206, 208. Each wired loop 202, 204, 206, 208 produces an eddy current. Because all four loops 202, 204, 206, 208 pass by the sensor 210 on the far left, while only one loop 208 passes by the sensor 210 on the far right, there is most likely a temperature gradient existing between the sensors. The placement of the high voltage regulators 214 away from the sensors 210 and differential drivers 212 creates these large loops. This in turn provides a situation where the gain of each sensor will be distinct because the temperature at each sensor is distinct. In such a configuration 200, individual temperature sensors for each photosensor 210 could be used to adjust the voltage sent by the high voltage regulators 214. However, such a configuration can be less than ideal because the large current loops 202, 204, 206, 208 will result in additional temperature changes when the high voltage changes, resulting in multiple loops all shifting simultaneously, and therefore creating difficulty in establishing an equilibrium. Instead, a preferred configuration has smaller current loops.

Figure 3:
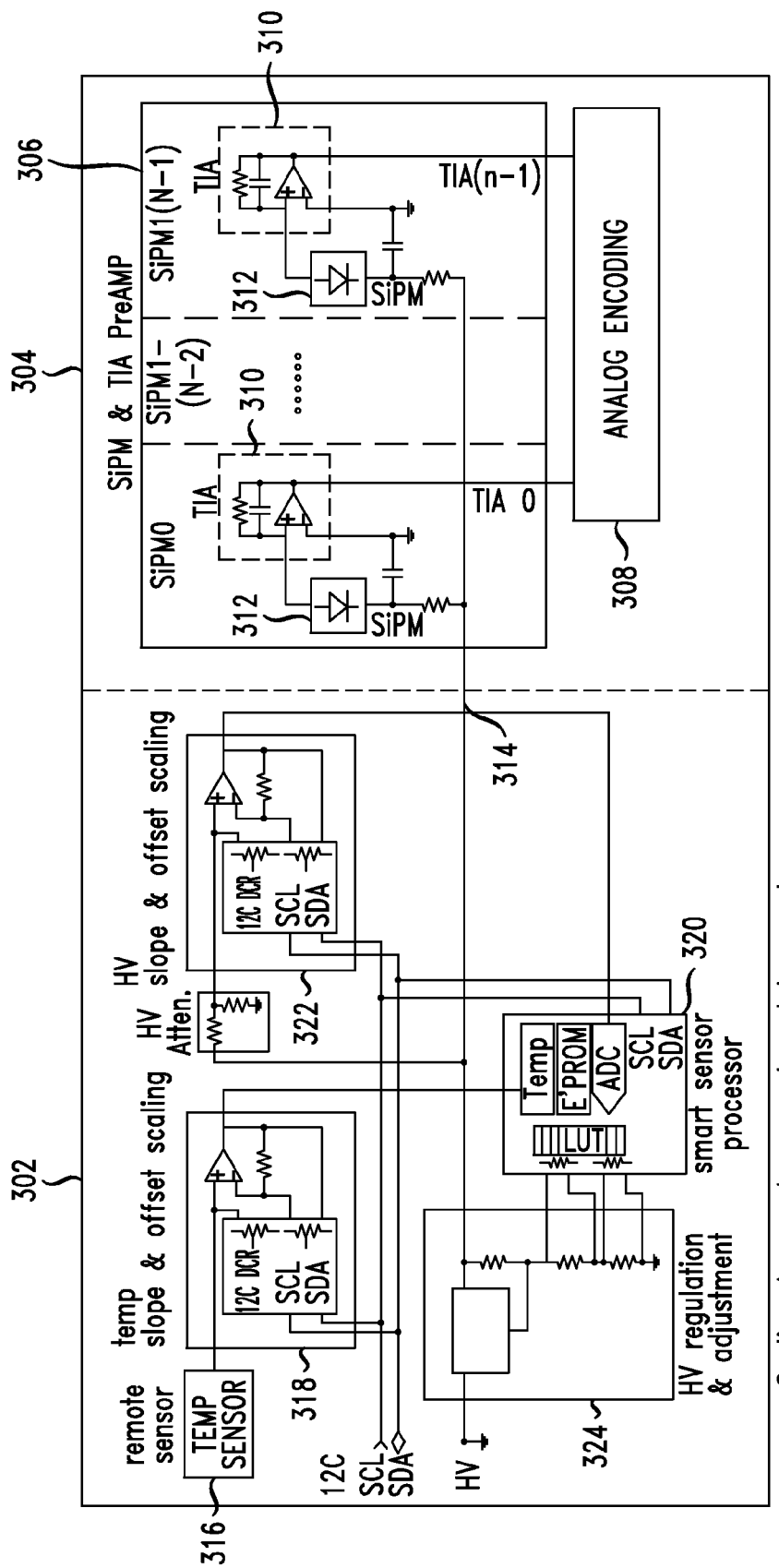
FIG. 3 illustrates an exemplary embodiment of the present invention.

FIG. 3 illustrates an exemplary system embodiment 300. In this embodiment 300, there are two subsections 302, 304. The first subsection represents a smart sensor 302, while the second subsection represents a PET sensor and associated circuitry 304.

The smart sensor 302 has a temperature sensor 316 which determines the temperature at a specific location within the system. This temperature sensor 316 outputs a digital and/or analog signal to a temperature slope and offset scaling module 318. The temperature slope and offset scaling module 318 modifies or processes the temperature data, placing it in a format or configuration that allows future processing. In certain configurations, this temperature slope and offset scaling module 318 can be unnecessary, because processors can directly receive and interpret the raw temperature data. In other configurations, the temperature data can be manipulated, amplified, or otherwise formatted in preparation for further usage.

The temperature data output from the temperature slope and offset scaling module 318 is received by a smart sensor processor 320. The smart sensor processor 320 analyzes the temperature data, as well as current voltage levels, using a look-up table (LUT). The look-up table can be found in an EEPROM, and can contain a list of possible temperature data values corresponding to voltage input values. Based on the temperature data received, the smart sensor will then output a corresponding voltage to the photosensor. For example, if the temperature sensor data indicates that it is 10° C., the smart sensor processor 320 can, upon receiving the temperature data, compare 10° C. to the list in the EEPROM, and retrieve the corresponding voltage value needed to obtain the gain desired. The relationship between the corresponding temperatures and voltages in the EEPROM can be linear or non-linear. Because the EEPROM contains the relationship, in certain configurations users can change or modify the list based on specific needs or circumstances. For instance, if the sensor is to be used in a cold environment, a user might replace the list to have more emphasis on lower temperatures, whereas if the sensor is to be deployed to a hot environment the list may have more emphasis on higher temperatures.

The temperatures in the lookup-table can have a gradient and a range. For instance, in one configuration, the smart sensor 302 can have a look-up table containing a range of 10° C. and a gradient of 0.1° C. corresponding to each voltage level, thereby having 100 possible voltage levels. These voltage levels can possibly repeat throughout the temperature range, depending on how the list has been established. In other configurations, the range might be 50° C. with a gradient of 0.2° C., thereby corresponding to 250 possible voltage levels. Other configurations can store more or less voltage levels, higher or lower temperature gradients, and have smaller or larger temperature ranges. In addition, the temperature gradient can vary. For example, the LUT can have a gradient of 0.1° C. for temperatures in the 'main' range of the sensor, and a gradient of 0.5° C. for temperatures outside of that main range.

The smart processor 320, in determining what output voltage corresponds to the current temperature data: (1) receives the external temperature data; (2) conditions the sensing voltage-temperature curve offset and slope; (3) addresses the conditioner value and indexes it to a proper context; and (4) provides a variable resistor, or POT, with a proper resistor value. As an alternative to setting a resistor value, the smart processor 320 can output the voltage directly.

Once the smart sensor processor 320 has determined the output voltage corresponding to the current temperature, the output voltage acts as a bias voltage 314 to the positron sensor 304. Alternatively, the smart sensor processor 320 outputs this information for high-voltage regulation and adjustment 324. The HV regulation and adjustment block 324 includes a detector cassette "bulk" regulator and local block regulators. The bulk regulator tolerates a wide range of externally supplied high voltage. For example, one such bulk regulator can tolerate from 92 volts up to 450 volts. The local regulator is cascaded and improves accuracy and stability. It also functions as a high-voltage adjustment element due to the fact that each detector block can have a different high voltage bias. Adjusting the high-voltage can also be performed by automatically adjusting a variable resistor value.

The smart sensor 302 can also adjust the slope and scale of the bias voltage, when necessary, using a high-voltage scale and offset scaling module 322. This module 322 can detect the current voltage, attenuate, and adjust or modulate the voltage as required by the specific sensor. In this way, the sensor can receive the input values needed to correctly achieve the gain desired. In certain configurations, such as the one illustrated, the scaling module 322 provides feedback to the smart sensor processor 320, which uses the feedback to modify or otherwise change the output voltage.

Upon the smart sensor 302 calculating the bias voltage 314 required, based on the current temperature, to obtain a desired gain, the bias voltage 314 is provided to the PET sensor and associated circuitry 304. As illustrated, the sensors 306 can be a single sensor, or an array of sensors. As illustrated, each sensor 306 has two components—a transimpedance amplifier (TIA) 310 and a Silicon PhotoMultiplier (SiPM) 312. Other configurations can use other forms of photomultipliers or positron detectors, and can also use TIA circuits or other amplification circuitry. The gain produced by the amplification circuitry 310, as disclosed herein, is modified based on the bias voltage 314 to meet a desired gain. The resulting outputs are received by additional analog encoding 308 for processing of the data when the positron detector 312 outputs data.

Figure 4A:
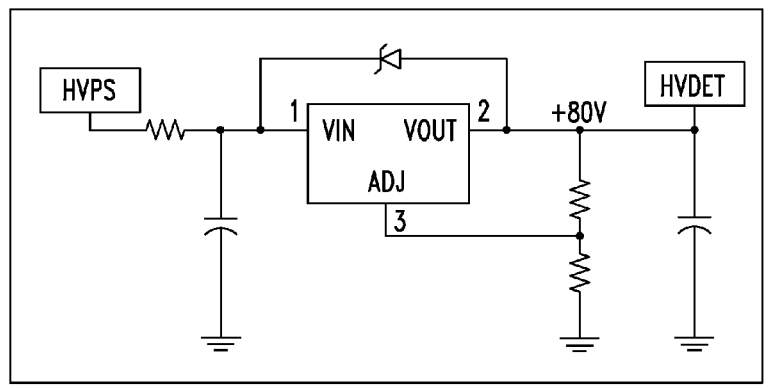
FIGS. 4A and 4B illustrate exemplary high voltage regulation circuits in accordance with the present invention.
Figure 4B:
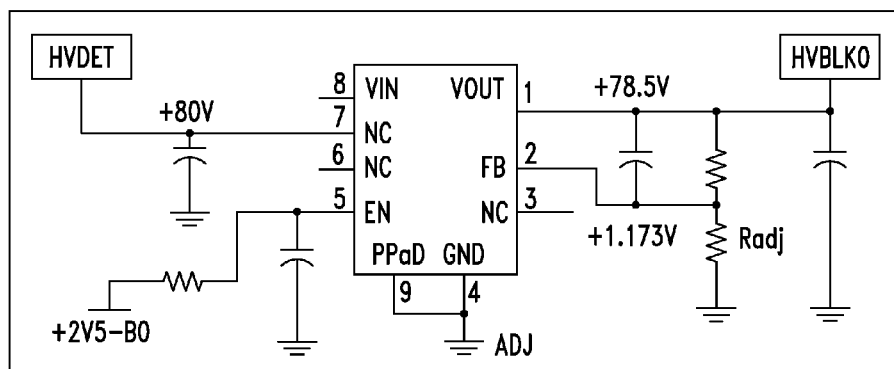

FIGS. 4A and 4B illustrate exemplary high-voltage regulation blocks. FIG. 4A illustrates a configuration of a SiPM high-voltage regulation per detector cassette, and FIG. 4B illustrates a configuration of a cascaded local high-voltage regulation per detector block. As stated above, the high-voltage regulation uses both a bulk regulator and local block regulators. These local block regulators, when cascaded, provide improved regulation accuracy and stability. They also function as a high-voltage adjustment element because each detector block will have a different high-voltage bias.

Figure 5A:
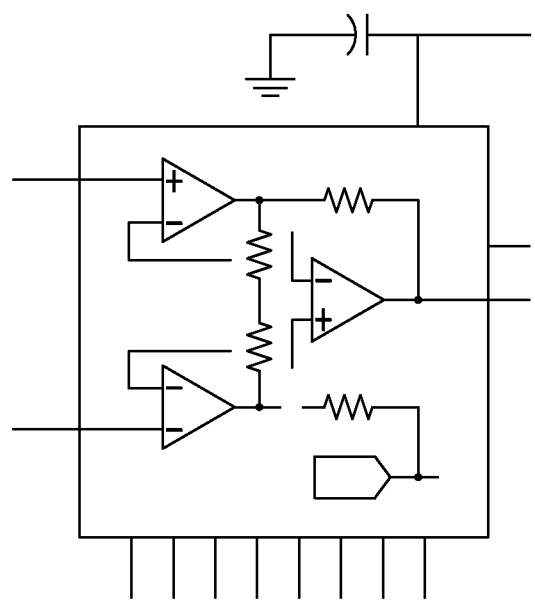
FIGS. 5A, 5B, and 5C illustrate exemplary high voltage slope and offset scaling circuits in accordance with the present invention.
Figure 5B:
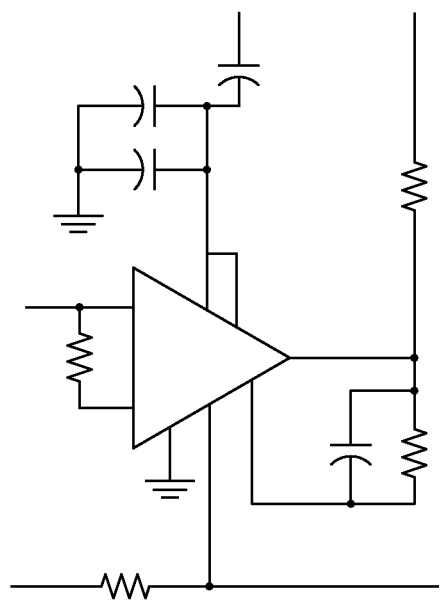
Figure 5C:
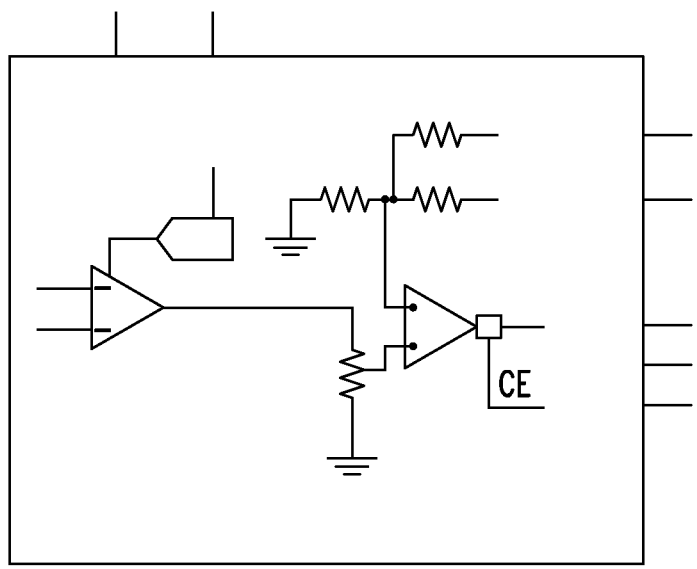

FIGS. 5A, 5B, and 5C illustrate exemplary temperature compensation circuits which correspond to the high-voltage slope and offset scaling module 322 of FIG. 3. These exemplary opamp circuits are not exclusive. Other configurations can use opamp circuitry not illustrated herein, or can use combinations of these circuits and other circuits to compensate the temperature as desired. FIG. 5A illustrates an example of digitally programmable instrumentation opamps (such as the ADI AD8557 opamp). FIG. 5B illustrates an example of an analog preset instrumentation group (such as the ADI AD8553 opamp). Finally, FIG. 5C illustrates an example of a dedicated "Auto-zero amplifier with programmable gain and offset" integrated circuit (such as the Texas Instruments PGA308). Each of these amplifier circuits are chosen for the high-voltage and temperature offset and scaling conditioning process.

Figure 6:
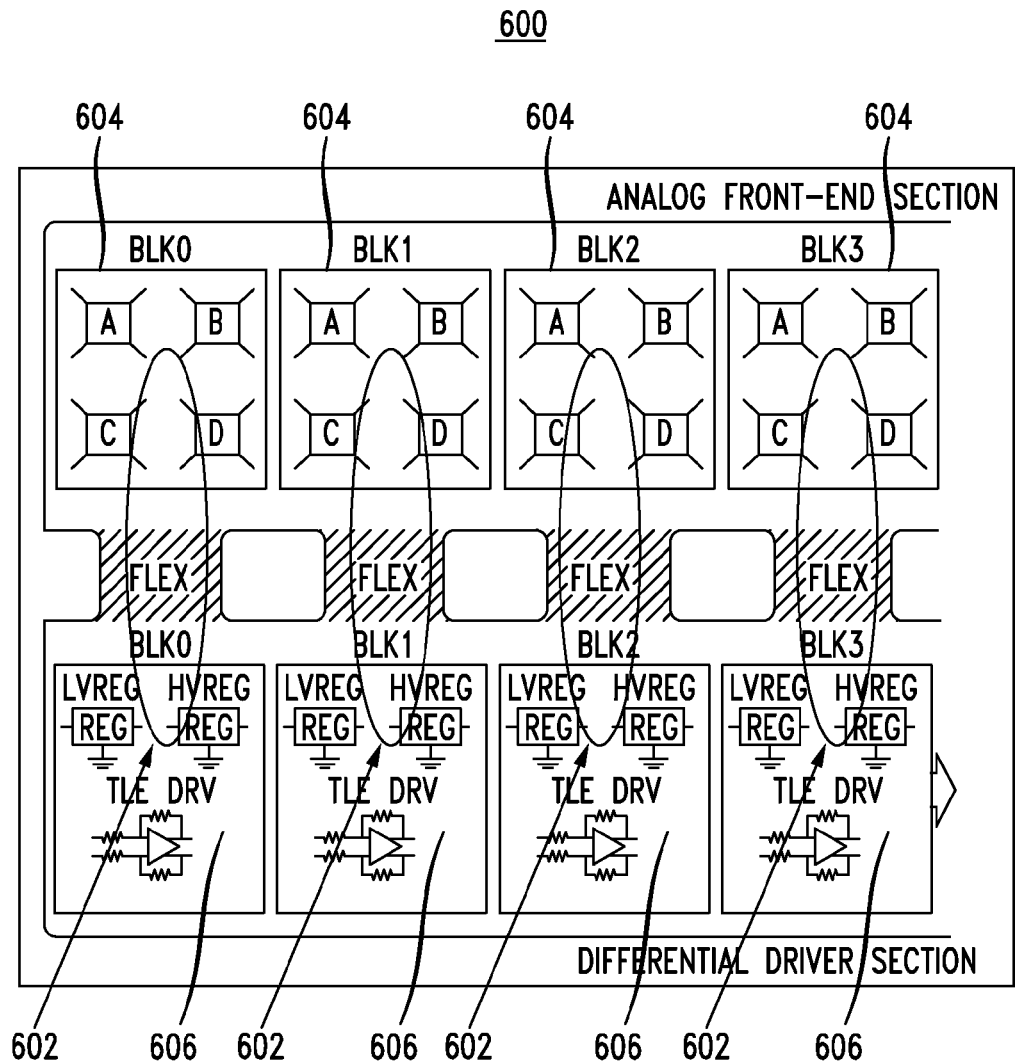
FIG. 6 illustrates eddy currents causes by exemplary embodiments.

FIG. 6 illustrates eddy currents caused by exemplary embodiments of the invention. In FIG. 2, the eddy currents were comparatively large due to the large wiring coils 202, 204, 206, 208. In comparison, the illustrated physical embodiment 600 has each voltage regulation unit 606 close to the corresponding photosensor 604 it regulates. The resulting coil 602 which extends between the photosensor 604 and the voltage regulation 606 is comparatively smaller, resulting in comparatively smaller eddy currents. Various configurations can have different types of regulation circuits or differential drivers. In addition, the specific distances and types of insulation between the photosensors 604 and high-voltage circuits 606 can vary.

Figure 7:
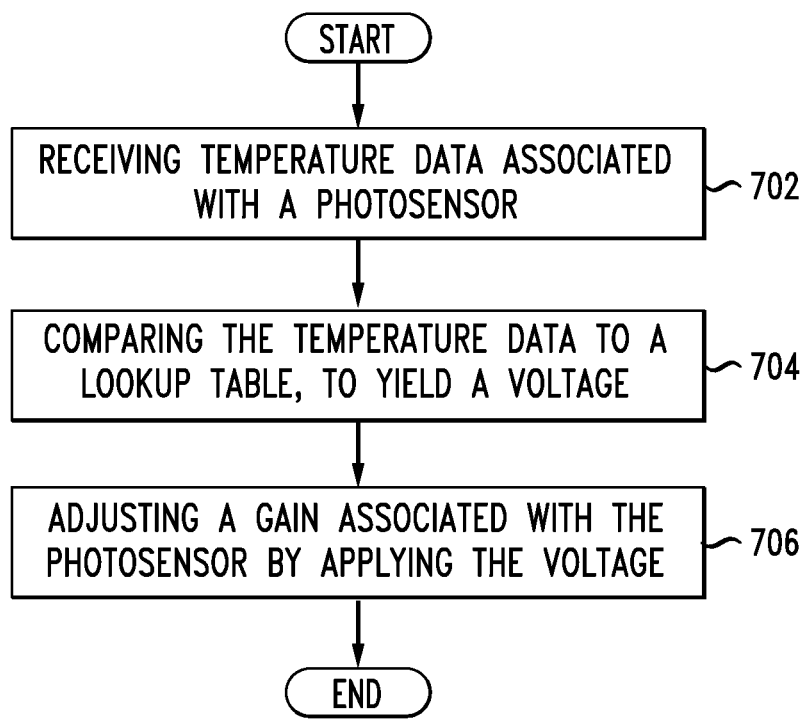
FIG. 7 illustrates an exemplary method embodiment in accordance with the present invention.

FIG. 7 illustrates an exemplary method embodiment. This method can be performed by a system comprising one or more processors and one or more tangible, or non-transitory, means for storing processor instructions. In addition, the system can include sensors for receiving input, circuitry for adapting or modifying data based on the input, and output devices capable of communicating results.

The system receives temperature data associated with a photosensor (702). This temperature data can be received from a temperature sensor associated with the system, or can be received from a source other than a temperature sensor. For instance, a temperature sensor can determine the temperature, then forward the temperature to circuitry which modifies or otherwise processes the temperature for interpretation. The photosensor in the system can be a Silicon PhotoMultipler (SiPM) or can be another form of sensor which can detect incident gamma photons, such as from positron annihilations, particularly during various forms of tomography.

Upon receiving the temperature or temperature data, the system compares the temperature data to a lookup table (704). This lookup table can be considered a list, where each temperature listed has a corresponding output voltage. By providing the output voltage to the photosensor, a gain can be maintained despite the changes in temperature. Therefore, the system compares the current temperature to the list found in the lookup table, yielding a voltage, then applies that voltage to the photosensor to adjust the gain of the photosensor (706).

The lookup table can be found in non-transitory, or tangible, computer-readable storage medium, such as an EEPROM. Within this lookup table, temperature can vary according to a gradient. For example, for certain temperature ranges the gradient can be 0.1° C., whereas at other temperature ranges the gradient can be 2° C. In addition, the lookup table can vary in the number of temperature specific output voltages stored, as well as the range of temperature stored. Furthermore, the relationship between the temperatures stored in the lookup table list and the corresponding voltage values for those temperatures can be linear or non-linear. After adjusting the gain, the sensor then continues to receive and output data according to normal function.

Although, the various embodiments have been described herein with respect to a PET-MRI system, the advantages of the invention described can also be used for cooling of any other devices operating in a strong magnetic field.

Portions of the system 100 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Other configurations are also possible. Thus, the breadth and scope of the present invention should not be limited by any of the above-described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. An apparatus for performing positron emission tomography (PET), comprising a plurality of PET detection units, each unit including:
    a scintillator that converts incident gamma photons into light photons;
    a photosensor having an input bias voltage, said photosensor detecting said light photons and converting them into an electrical signal having a gain associated with said input voltage; and
    a smart sensor, wherein said smart sensor includes
        a voltage regulator arranged to provide a bias voltage to said photosensor,
        a temperature sensor arranged to measure temperature associated with said photosensor,
        a computer-readable storage medium storing a temperature lookup table, and
        a processor configured to receive a temperature measurement from said temperature sensor, determine from the temperature lookup table a bias voltage associated with the temperature measurement, and to control said voltage regulator to provide to said photosensor the bias voltage determined from said lookup table;
    wherein each voltage regulator of said PET detection units is positioned with respect to its associated photosensor so as to minimize a temperature gradient across photosensors of said apparatus caused at least in part by eddy currents in current loops between said voltage regulators and associated photosensors.

2. The apparatus of claim 1, wherein the bias voltage provided to each photosensor maintains a desired gain associated with that photosensor.

3. The apparatus of claim 1, wherein the photosensor is a Silicon PhotoMultiplier (SiPM).

4. The apparatus of claim 1, wherein the temperature lookup table has a temperature gradient of 0.1° Celsius.

5. The apparatus of claim 1, wherein the temperature lookup table comprises a list of possible temperature data values associated with corresponding input bias voltage values.

6. The apparatus of claim 5, wherein the list comprises a non-linear relationship between the possible temperature data values associated with the corresponding input bias voltage values.

7. The apparatus of claim 1, wherein said apparatus further includes a magnetic resonance imaging (MRI) device integrated with said PET apparatus.

8. A system for adjusting gains of a plurality of photosensor blocks, comprising:
    a processor;
    and
    a computer-readable storage medium having stored instructions which, when executed, cause the processor to:
    receive a temperature measurement from a temperature sensor arranged to measure temperature associated with a specific photosensor block,
    determine from a temperature lookup table a bias voltage associated with the temperature measurement, and
    to control a voltage regulator associated with said specific photosensor block to provide to said specific photosensor block the bias voltage determined from said lookup table;
    wherein voltage regulators associated with said photosensor blocks are positioned so as to minimize a temperature gradient across photosensor blocks caused at least in part by eddy currents in current loops between said voltage regulators and associated photosensor blocks.

9. The system of claim 8, wherein the photosensors of said photosensor blocks are Silicon PhotoMultipliers (SiPMs).

10. The system of claim 8, wherein the lookup table has a temperature gradient of 0.1° Celsius.

11. The system of claim 8, wherein the lookup table comprises a list of possible temperature data values associated with corresponding bias voltage values.

12. The system of claim 8, wherein the list comprises a non-linear relationship between the possible temperature data values associated with the corresponding bias voltage values.

* * * * *